United States Patent
Switzer et al.

(10) Patent No.: US 10,901,108 B2
(45) Date of Patent: Jan. 26, 2021

(54) METHOD AND APPARATUS FOR PLACING RECEIVER ELECTRODES FOR EM TELEMETRY TRANSMISSIONS

(71) Applicant: Evolution Engineering Inc., Calgary (CA)

(72) Inventors: David A. Switzer, Calgary (CA); Aaron W. Logan, Calgary (CA)

(73) Assignee: Evolution Engineering Inc., Calgary (CA)

(*) Notice: Subject to any disclaimer, the term of this patent is extended or adjusted under 35 U.S.C. 154(b) by 78 days.

(21) Appl. No.: 16/194,108

(22) Filed: Nov. 16, 2018

(65) Prior Publication Data

US 2019/0154866 A1 May 23, 2019

Related U.S. Application Data

(60) Provisional application No. 62/588,186, filed on Nov. 17, 2017.

(51) Int. Cl.
| | |
|---|---|
| *G01V 3/17* | (2006.01) |
| *G01V 3/30* | (2006.01) |
| *G01V 3/34* | (2006.01) |
| *E21B 47/12* | (2012.01) |
| *E21B 47/13* | (2012.01) |

(52) U.S. Cl.
CPC .............. *G01V 3/17* (2013.01); *E21B 47/13* (2020.05); *G01V 3/30* (2013.01); *G01V 3/34* (2013.01)

(58) Field of Classification Search
None
See application file for complete search history.

(56) References Cited

U.S. PATENT DOCUMENTS

| | | | | |
|---|---|---|---|---|
| 4,739,325 | A * | 4/1988 | MacLeod ............... | E21B 17/003 340/854.4 |
| 4,920,655 | A * | 5/1990 | Van Steenwyk ...... | E21B 47/022 33/304 |
| 6,781,520 | B1 * | 8/2004 | Smith .................... | G01V 11/00 340/853.1 |

(Continued)

FOREIGN PATENT DOCUMENTS

| | | | | |
|---|---|---|---|---|
| EP | 2743712 A1 * | 6/2014 | ............. | G01R 31/52 |

*Primary Examiner* — Jermele M Hollington
(74) *Attorney, Agent, or Firm* — Oyen Wiggs Green & Mutala LLP

(57) ABSTRACT

A vehicle for detecting fields relevant to the suitability of a location for EM telemetry reception. The vehicle may include a magnetometer, a voltage monitoring system and position sensors. A wireless transmitter may transmit readings from the meters, monitoring systems and/or sensors to a receiver. The vehicle may include equipment for inserting or removing ground conductors for use in receiving electromagnetic telemetry signals. The vehicle may be driven or may drive itself autonomously. The vehicle may obtain measurements of magnetic field and/or potential differences at spaced apart locations along a path. Data obtained by the vehicle may be analyzed to identify hot spots. After selecting hot spots, the vehicle may be configured to insert ground conductors at selected locations within the hot spots. After installing ground rods, the vehicle may be configured to continuously monitor the area to maintain an optimum configuration of ground conductors.

22 Claims, 3 Drawing Sheets

(56) References Cited

U.S. PATENT DOCUMENTS

| | | | |
|---|---|---|---|
| 7,443,167 B2* | 10/2008 | Siegel | G01V 3/15 |
| | | | 324/244 |
| 7,629,790 B2* | 12/2009 | Stolarczyk | G01V 3/17 |
| | | | 324/329 |
| 10,403,113 B1* | 9/2019 | Antar | B60L 53/12 |
| 2005/0110496 A1* | 5/2005 | Siegel | G01V 3/15 |
| | | | 324/329 |
| 2006/0145889 A1* | 7/2006 | Rawle | G01V 11/002 |
| | | | 340/853.1 |
| 2008/0218170 A1* | 9/2008 | Stolarczyk | G01V 3/17 |
| | | | 324/330 |
| 2016/0061984 A1* | 3/2016 | Partner | G01V 3/10 |
| | | | 324/330 |

* cited by examiner

METHOD AND APPARATUS FOR PLACING RECEIVER ELECTRODES FOR EM TELEMETRY TRANSMISSIONS

CROSS-REFERENCE TO RELATED APPLICATIONS

This application claims the benefit under 35 U.S.C. § 119 of U.S. application No. 62/588,186 filed 17 Nov. 2017 and entitled METHOD AND APPARATUS FOR PLACING RECEIVER ELECTRODES FOR EM TELEMETRY TRANSMISSIONS which is hereby incorporated herein by reference for all purposes.

TECHNICAL FIELD

This application relates to subsurface drilling, specifically to methods and apparatus for placing receiver electrodes for use in electromagnetic telemetry transmissions. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole probe. A downhole probe may comprise any active mechanical, electronic, and/or electro-mechanical system that operates downhole. A probe may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A probe may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc.

A downhole probe may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe. Disadvantages of EM telemetry include lower depth capability, incompatibility with some formations (for example, high salt formations and formations of high resistivity contrast), and some market resistance due to acceptance of older established methods. Also, as the EM transmission is strongly attenuated over long distances through the earth formations, it requires a relatively large amount of power so that the signals are detected at surface. The electrical power available to generate EM signals may be provided by batteries or another power source that has limited capacity.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a bottom hole assembly such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface. (Higher frequency signals attenuate faster than low frequency signals.) The electromagnetic signals may be detected at the surface, for example by measuring electrical potential differences between the drill string or a metal casing that extends into the ground and one or more ground rods.

One challenge in setting up a receiving system for receiving uplink signals from a downhole electromagnetic telemetry system is to find appropriate locations for receiving antennas. Due to variations in the nature of the soil near the surface as well as the arrangement of underground formations, the quality of signal reception can vary significantly depending upon the particular locations chosen for antennas (e.g. ground rods) for picking up the EM telemetry signals. A further complication is that each ground rod should be located at positions that are not in the way of other activities in the vicinity of the well being drilled.

SUMMARY

The invention has a number of different aspects. These include, without limitation:
- a vehicle for identifying optimum locations for receiving electromagnetic signals;
- a vehicle for placing receiver electrodes for electromagnetic telemetry transmissions;
- methods for identifying optimum locations for receiving electromagnetic signals; and
- methods for operating a vehicle for identifying optimum locations for receiving electromagnetic signals.

One example aspect provides a vehicle for detecting fields relevant to the suitability of a location for EM telemetry reception. The vehicle may include a magnetometer, a voltage monitoring system and position sensors. In some embodiments, a wireless transmitter transmits readings from the meters, monitoring systems and/or sensors to a receiver. The voltage monitoring system may comprise ground electrodes. The ground electrodes may be designed to remain in contact with the ground or be inserted into the ground when the vehicle is stopped.

In some embodiments, the vehicle may have an additional voltage sensor which trails behind the vehicle. In other embodiments, some or all of the tires or tracks of the vehicle may include ground contacting electrical conductors that are connected to supply inputs to the voltage sensor. In further embodiments, one or more ground electrodes may be retractably mounted to the vehicle.

In some embodiments, the vehicle includes equipment for inserting or removing ground conductors for use in receiving electromagnetic telemetry signals. A ram may be provided to ram (i.e. advance) a rod into the ground or a rotary motor may be provided to advance a helical ground conductor into the ground. Ground conductors may be advanced into the ground at various angles. For example, the angle of the ground conductor may be such that it aligns with the trajectory of the drill bit.

Another example aspect of the invention provides a method of operation of a vehicle for identifying optimum locations for receiving electromagnetic signals. The vehicle may be driven or may drive itself autonomously. The vehicle may obtain measurements of magnetic field and/or potential differences at spaced apart locations along a path. The path may be a spiral path starting at the edge of a lease boundary.

While the vehicle is taking measurements, a signal may be generated by an electromagnetic telemetry transmitter which is downhole or attached to a blowout preventer. The signals may be known. The vehicle may use these signals to improve its opportunity to detect further signals.

Data obtained by the vehicle may be analyzed in real time or upon completion of a survey in order to identify hot spots. Once a vehicle has selected hot spots, the vehicle may be configured to insert ground conductors at selected locations within the hot spots. After installing ground rods, the vehicle may be configured to continuously monitor for new or changing hot spots in order to maintain an optimum configuration of ground conductors.

Another aspect provides apparatus for determining one or more locations for placing receiver electrodes for electromagnetic telemetry. The apparatus comprises a motorized vehicle carrying at least one sensor for detecting electromagnetic energy and at least one position sensor; a first ground conductor engageable with ground under or adjacent to the vehicle; and a voltage monitor connected to measure a differential voltage between the first ground conductor and a second ground conductor.

In some embodiments the first ground conductor is adapted to engage the ground while the vehicle is in motion. For example, the first ground conductor may be mounted to a wheel or track carried by the vehicle and may comprise electrically conductive protrusions that penetrate into the ground.

In some embodiments the second ground conductor is installed in the ground at a selected location spaced apart from the vehicle and is electrically connected to the voltage monitor by a cable. The vehicle may carry a reel for winding the cable onto. The reel may optionally automatically let out or wind up the cable.

In some embodiments the first ground conductor is retractably mounted to the vehicle and the vehicle comprises an actuator operable to selectively advance the first ground conductor into engagement with the ground or retract the first ground conductor out of engagement with the ground and a controller connected to control the actuator. The controller may be configured to conduct a measurement by operating the actuator to engage the first ground conductor with the ground, operating the voltage monitor to measure the differential voltage to log the differential voltage together with a position of the vehicle as determined by the position sensor. Other information such as magnetic fields detected by one or more magnetic field sensors may optionally be measured and logged. The controller may optionally be connected to control a motor of the vehicle and configured to shut down the motor while operating the voltage monitor to measure the differential voltage.

Some embodiments include one or more second actuators connected to adjust an angle of the first ground conductor relative to the ground. In such embodiments the controller may be configured to control the one or more second actuators to set the angle of the first ground conductor to be substantially parallel to a portion of a trajectory of a well bore.

In some embodiments the vehicle comprises a fluid tank for containing a conductivity-enhancing fluid and a pump connected to deliver the conductively-enhancing fluid from the fluid tank to a fluid injector. The fluid injector may be configured to dispense the conductivity-enhancing fluid in the vicinity of the first ground conductor. In some embodiments the first ground conductor is hollow and the pump is connected to deliver the conductivity-enhancing fluid to a bore of the first ground conductor and to thereby inject the conductivity-enhancing fluid into the ground in the vicinity of the first ground conductor.

Some embodiments include a mapping system that stores a location of a well head and a boundary. The mapping system may include a display showing a location of the vehicle relative to the well head and boundary. The mapping system may optionally show locations of hot spots for EM telemetry reception.

In some embodiments the vehicle comprises an autonomous navigation system configurable to cause the vehicle to follow a search path and to acquire and log measurements of the voltage differential at locations spaced apart along the search path.

Another aspect provides a method for locating locations to place receiver electrodes for receiving electromagnetic telemetry transmissions. The method comprises, while operating a downhole EM telemetry signal generator in a borehole to emit a test signal, monitoring for the test signal at plural locations around the borehole using at least one sensor for detecting electromagnetic energy relevant to a suitability of a location for electromagnetic telemetry reception. The at least one sensor is mounted on a vehicle and the method includes: moving the vehicle to different ones of the plural locations around the borehole; and recording positions of one or more of the plural locations at which the test signal is most strongly detected.

Another aspect provides a method for placing receiver electrodes for receiving electromagnetic telemetry transmissions. The method comprises, while operating a downhole EM telemetry signal generator in a borehole to emit a test signal, monitoring for the test signal at locations around the borehole using at least one sensor for detecting electromagnetic energy relevant to a suitability of a location for electromagnetic telemetry reception. The at least one sensor is mounted on a vehicle. The vehicle is autonomously controlled to traverse a search path, monitor for the test signal at locations along the search path, record positions of one or more of the locations along the search path at which the test signal is most strongly detected and place a ground conductor at one or more of the recorded positions.

Further aspects of the invention and features of example embodiments are illustrated in the accompanying drawings and/or described in the following description.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
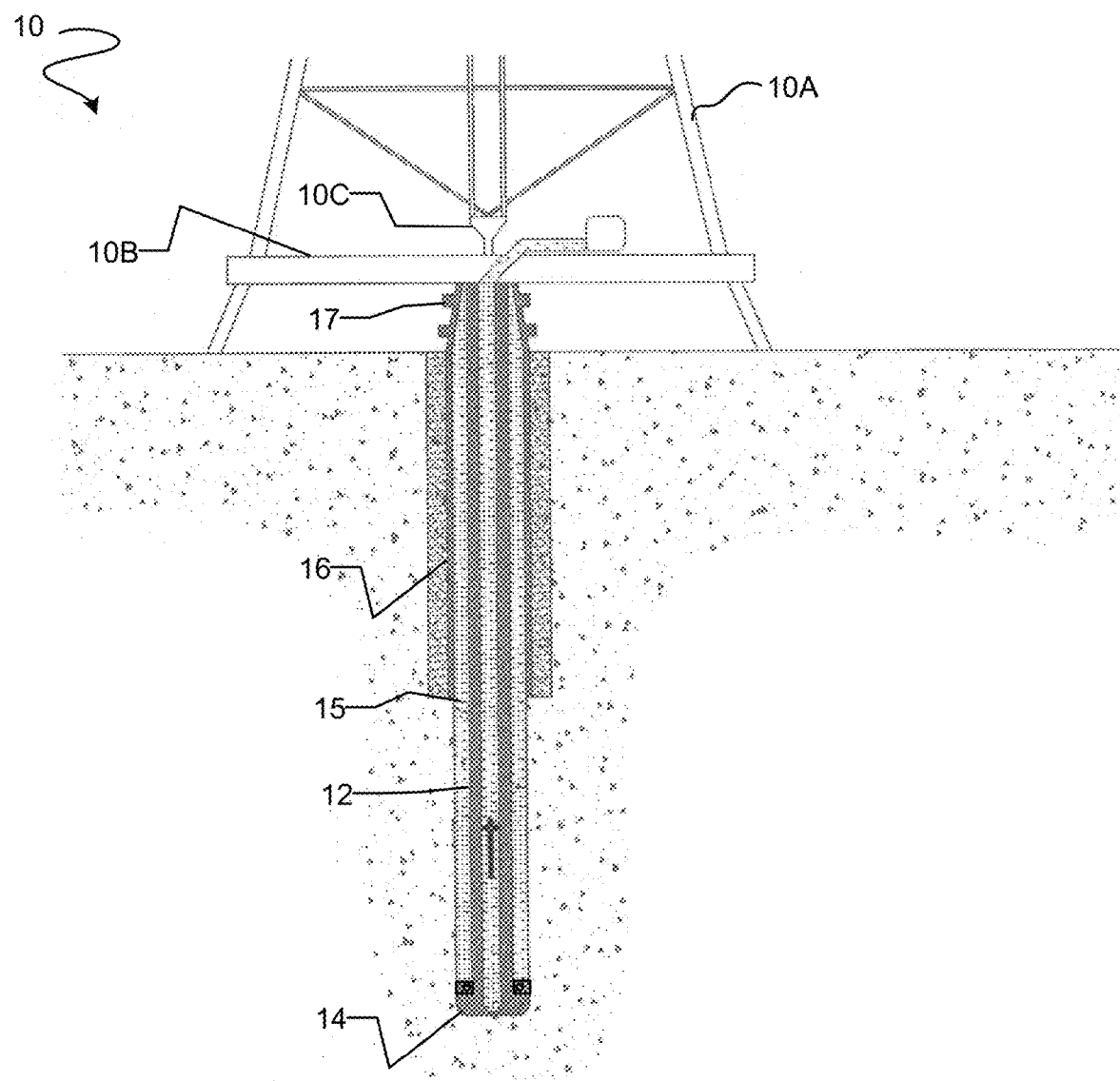
FIG. 1 is a schematic view of a drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 100 for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

An embodiment of this invention provides a vehicle equipped with sensors which are useful for identifying optimum locations for receiving EM telemetry signals. The vehicle may optionally have equipment for installing and/or removing ground electrodes as well as equipment for managing cables for carrying signals from the ground electrodes to an EM telemetry receiver.

Figure 2:
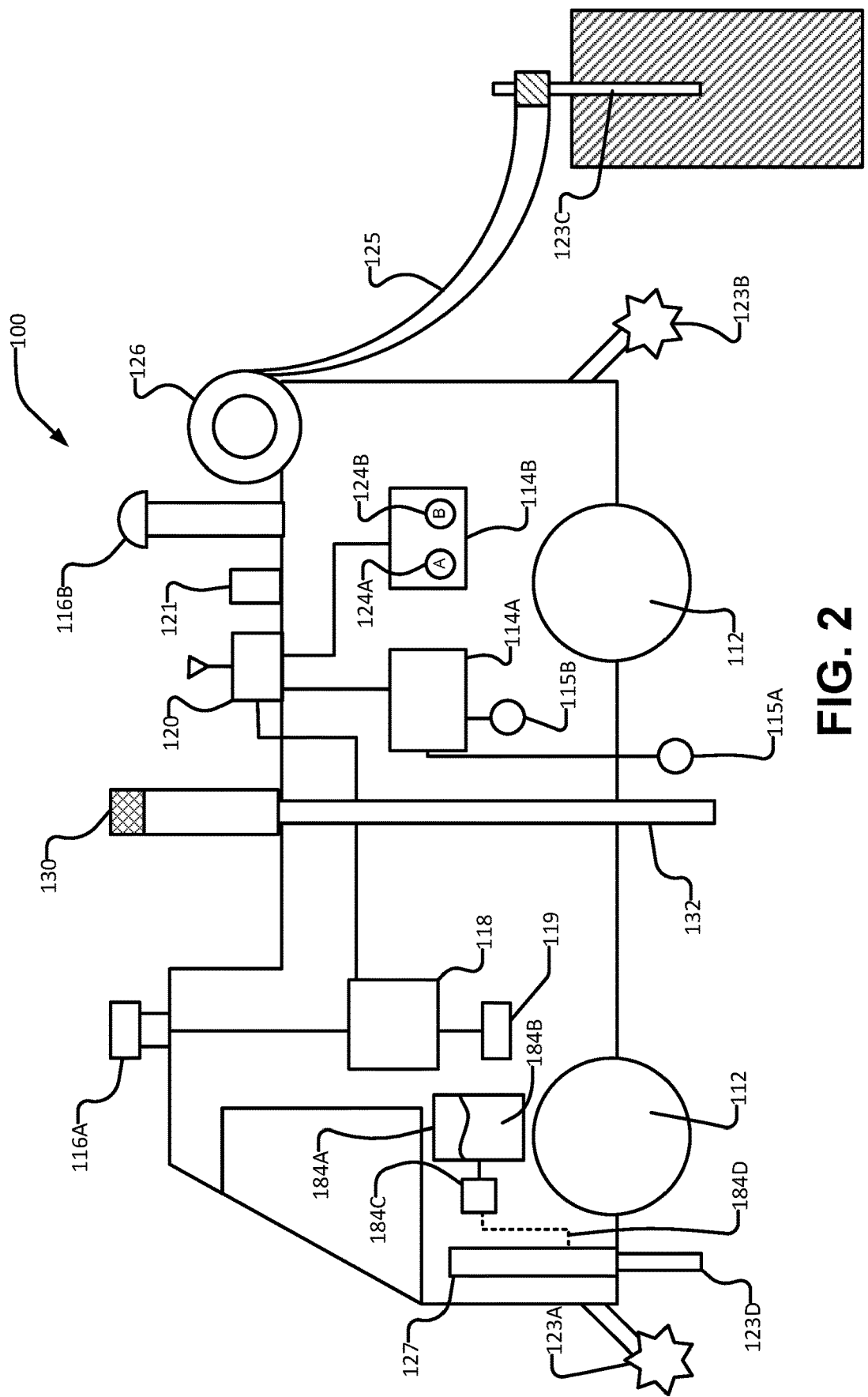
FIG. 2 is a schematic view of a vehicle according to an example embodiment of the invention.

FIG. 2 illustrates an example vehicle 100. Vehicle 100 has wheels or tracks 112 to allow it to be driven around the vicinity of a drilling operation. Vehicle 100 may take any of many forms. Advantageously, vehicle 100 is capable of off-road travel. For example, vehicle 100 may be an all-wheel drive vehicle or a tracked vehicle. Vehicle 100 is not necessarily a large vehicle. For some applications it is desirable that vehicle 100 be relatively light in weight and relatively narrow such that the impact of vehicle 100 on the environment is reduced.

Vehicle 100 includes sensors 114 for detecting fields relevant to the suitability of a location for EM telemetry reception. In the illustrated embodiment, vehicle 100 carries a magnetometer 114A and a voltage monitor 114B. Magnetometer 114A may, for example, comprise a flux stage magnetometer. The magnetometer may measure localized magnetic fields to identify magnetic hot spots as well as areas in which other signals may interfere with reception of an EM telemetry signal. Vehicle 100 includes one or more position sensors 116. Position sensor 116 may, for example, comprise GPS position sensors. The illustrated embodiment provides GPS position sensors 116A and 116B. In some embodiments, a GPS base station is provided near the well site. The GPS base station may transmit differential corrections to provide improved positional accuracy of the location signals obtained by GPS position sensors 116A and 116B. For example, with a suitable base station, the positions of GPS position sensors 116A and 116B may be determined to an accuracy of a few centimetres relative to the base stations. GPS position sensors 116A and 116B are connected to a mapping unit 118 which may include map data defining a boundary of a lease area surrounding the well being drilled.

In the illustrated embodiment, a wireless transmitter 120 transmits to a receiver readings from magnetometer 114A and/or voltage sensor 114B together with location information obtained using GPS system 119 which identifies the locations at which those readings were obtained. GPS system 119 may, for example, comprise one or more position sensors 116 described elsewhere herein. Vehicle 100 may include a logging system 121 in addition to or in the alternative to wireless transmitter 120. In either case, after vehicle 100 completes a survey of potential sites for grounding rods, information regarding the characteristics of these sites acquired using sensors 114 is available by studying readings which have been transmitted by way of wireless system 120 and/or readings stored in a logging system 121.

Voltage monitoring system 114B monitors a voltage differential between two ground electrodes. The ground electrodes may be designed to remain in contact with the ground as vehicle 100 moves along a path or, in the alternative, may be designed to be inserted into the ground when vehicle 100 is stopped to acquire readings from sensors 114. In some embodiments, the electrodes for sensing the differential voltages in the ground may comprise wheels or tracks which have projecting from them spikes or other electrically conductive ground-engaging electrodes that project into the earth. In the illustrated embodiment, spiked wheels 123A and 123B provide electrodes that can be advanced to engage the ground. Electrode wheels 123A and 123B are respectively connected to inputs 124A and 124B of voltage sensor 114B. Vehicle 100 may monitor a difference in voltage between ground rod 123C and one or both of ground-contacting electrode wheels 123A and 123B.

In some embodiments, in addition to or in the alternative, one of the inputs of voltage sensor 114B is connected by way of a cable which is trailed behind vehicle 100 to a ground rod installed at a selected location on the lease. In the illustrated embodiment, a ground rod 123C is electrically coupled to voltage sensor 114B by a cable 125 trailed from vehicle 100 from a cable wheel 126.

In still other embodiments, some or all of tires or tracks 112 include ground-contacting electrical conductors that are connected to supply inputs to voltage sensor 114B.

As a further alternative for providing points of ground contact for monitoring ground voltages, one or more ground electrodes may be retractably mounted to vehicle 100. These ground electrodes may, for example, comprise blades, rods, or the like that are attached to vehicle 100 by a mechanism which allows them to be selectively advanced into the earth or retracted. Such ground-contacting electrodes may be, for example, advanced and retracted using an electrical actuator such as an electric motor or a linear actuator, a pneumatic actuator, a hydraulic actuator, or the like. In the illustrated embodiment, an extendable ground rod 123D which is selectively advanced or retracted by an actuator 127 is provided. Vehicle 100 may, for example, include an interlock which prevents vehicle 100 from being driven while ground rod 123D is extended.

Vehicle 100 may optionally comprise a container of water, brine, or other fluid suitable for improving electrical connection of a ground-contacting electrode to the ground. Such fluid may, for example, be sprayed onto the ground in the vicinity of a ground rod 123D and/or injected into the ground through a bore in ground rod 123D and/or injected into the ground by other tubular injectors forced into the ground in the vicinity of ground rod 123D. Vehicle 100 may, for example, comprise a fluid tank 184A containing a conductivity-enhancing fluid 184B, and a pump 184C connected to deliver fluid 184B to a fluid injector (in this example, hollow ground rod 123D is used as a fluid injector as shown by example dashed connection 184D).

Vehicle 100 may optionally include equipment for inserting or removing ground rods for use in receiving EM telemetry signals. In the illustrated embodiment, a ram 130 is mounted on vehicle 100. Ram 130 may be advanced to push into the ground a ground rod 132 for use as a receiver for electromagnetic telemetry signals or as a noise cancellation input for an EM telemetry signal receiver. In some embodiments, ram 130 may be configured to angle the ground conductors so that they are placed in the earth at an angle extending in a direction which matches a trajectory which is aligned with the drill bit direction. In some embodiments, ram 130 or an alternative mechanism for driving a ground conductor is mounted on a support that is tiltable about 2 axes. In some such embodiments, power actuators are provided to control tilt of the ground conductor driver. Vehicle 100 may be configured to receive or store information specifying a trajectory of a well bore and, using information regarding the position and orientation of vehicle 100 (and optionally information from a level sensor which senses pitch and roll angles for vehicle 100 to drive the power actuators) to set the angles of the ground conductor driver such that an angle of the ground conductor will match the trajectory of a relevant portion of the well bore (e.g. a portion of the well bore that includes an EM telemetry transmitter).

Ground conductors for use in receiving EM telemetry signals and/or for use as a noise cancellation input are not necessarily rods. Such ground conductors may comprise rods, blades, or the like. In other embodiments, such conductors comprise helical screws that may be screwed into the earth. In embodiments which use helical screws, a rotary motor may be provided on vehicle 100 to rotate a ground conductor being installed as that ground conductor is advanced into the earth. The rotary motor may be hydraulically driven, for example.

In the illustrated embodiment, vehicle 100 is of a type which is driven by a human operator. However, in some embodiments vehicle 100 could comprise an autonomous vehicle which is self-driving using signals from, for example, GPS position sensors 116A and 116B to verify its current position.

In some embodiments, vehicle 100 could comprise an autonomous vehicle which is operated remotely by an operator. In some embodiments, vehicle 100 is remotely operated within a field of view of the operator. In some embodiments, vehicle 100 is outside of a field of view of the operator. In such embodiments, the operator may, for example, rely on one or more of a live-video feed, display of operating data in real time (which may include positional coordinates of vehicle 100), a live-audio feed or the like when remotely operating vehicle 100.

The precise position of ground rod 132 may be known from monitoring the position of vehicle 100 using GPS position sensors 116A and 116B when ground rod 132 is being driven (together with any known offset between ram 130 and GPS position sensors 116A and/or 116B).

In some embodiments, magnetometer 114A comprises sensors at different elevations above the ground. For example, one magnetic field sensor may be mounted near to the ground and another magnetic sensor may be mounted at a higher elevation. In the illustrated embodiment, magnetic field sensors 115A and 115B are provided. Magnetic field sensor 115A senses a magnetic field at or close to the ground surface. For example, magnetic sensor 115A may be mounted on a shoe or the like that sits on and follows the ground as vehicle 100 is moved along. Magnetic sensor 115B may be mounted at a desired elevation above magnetic sensor 115A. For example, magnetic sensor 115B may be somewhere from between 25 to 75 centimetres, or greater as decided by a person skilled in the art, above magnetic sensor 115A. Providing two magnetic field sensors may assist in isolating magnetic signals resulting from electromagnetic telemetry signals propagating in the ground from electromagnetic noise. The differential between the magnetic fields detected by sensors 115A and 115B may be used in identifying a place in which the EM telemetry signal is strongest.

In order to facilitate detection of magnetic fields, vehicle 100 may be fabricated entirely from non-magnetic materials or at least vehicle 100 may be constructed such that any magnetic components of vehicle 100 are located well away from magnetic field sensors 115A and 115B. In some embodiments, vehicle 100 comprises a trailer carrying magnetic field sensors 115A and 115B and GPS position sensors 116A and 116B. The trailer may be fabricated from non-magnetic materials and may be towed behind another vehicle.

Figure 3:
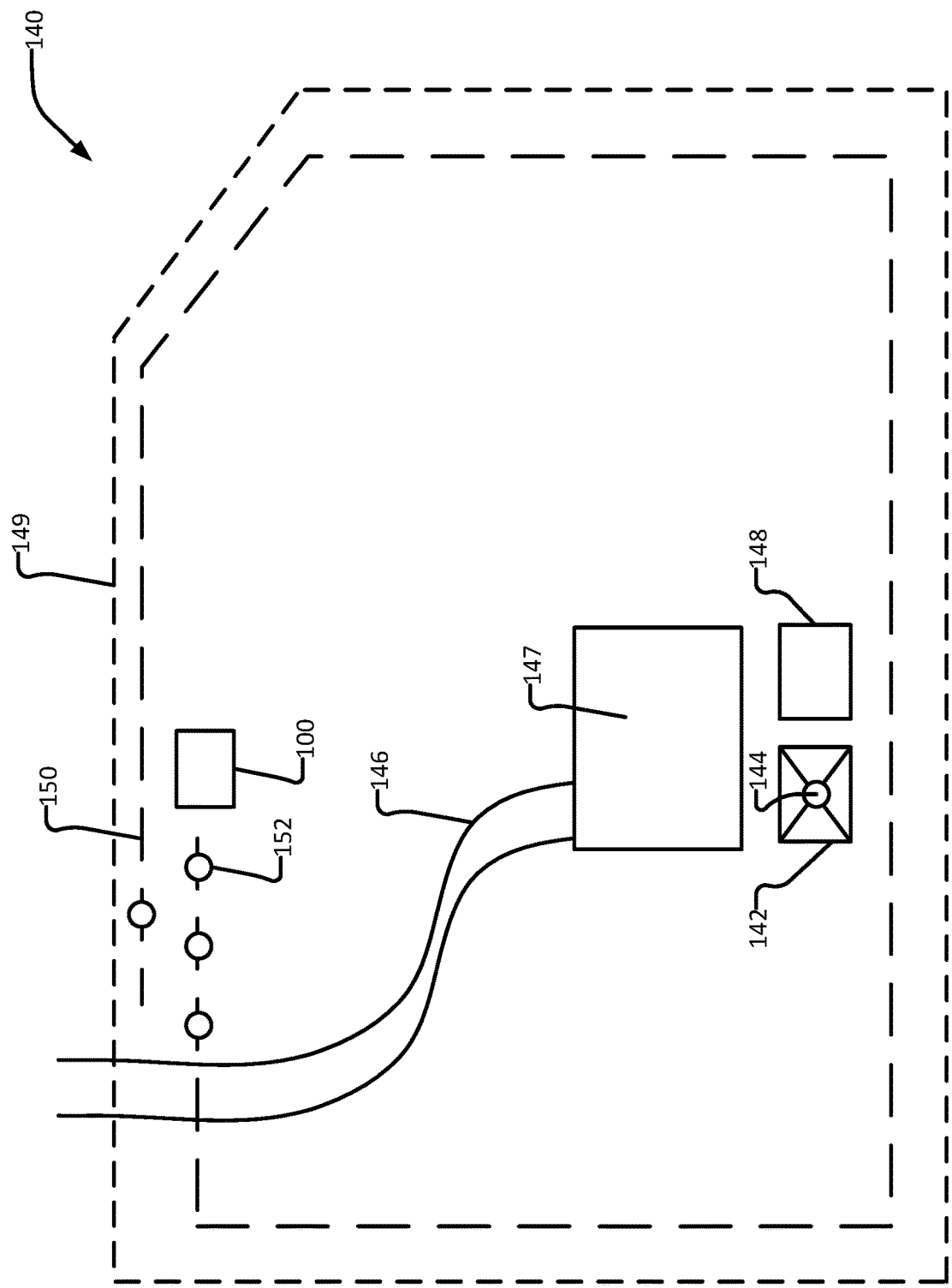
FIG. 3 is a schematic top view of an example drilling operation site.

FIG. 3 illustrates a well site 140 which includes a drill rig 142 drilling a well through a blowout preventer 144. Also shown in FIG. 3 are an access road 146, a parking area 147, and equipment 148 associated with drill rig 142. Activities associated with the drilling, including the placement of conductors for detecting electromagnetic telemetry signals are confined within a lease boundary 149. The position of lease boundary 149 may be stored in mapping unit 118 of vehicle 100. This information may be used to either guide a human operator of vehicle 100 to find optimum locations for electrodes within lease boundary 149 and/or to guide an autonomous vehicle 100 to perform a search path within lease boundary 149.

In operation, vehicle 100 may be driven (or may drive itself autonomously) in a search pattern including a search path 150. As vehicle 100 advances along path 150, it obtains measurements of magnetic field (or magnetic field and electrical potential differences) at spaced apart locations 152 along path 150. In order to obtain measurements which are not affected by electromagnetic interference from motors or engines of vehicle 100, the motors or engines of vehicle 100 may be shut down for the purposes of obtaining measurements at locations 152. In some embodiments, a process for shutting down drive motors or engines of vehicle 100 and obtaining measurements is automated by a controller, such as a programmable controller. In some embodiments the locations 152 are selected automatically. For example, vehicle 100 may be configured to take measurements at locations 152 that are spaced apart from one another by a certain distance.

In an example embodiment, an operator drives vehicle 100 along path 150. The operator may do so using guidance from a mapping screen which shows a desired path 150 and the current position of vehicle 100 as determined by GPS position sensors 116A and 116B. At spaced apart locations 152, a measurement process may be triggered either by the operator or by vehicle 100 automatically or by some combination of these.

As an example of a combination of automatic and operator control, vehicle 100 may signal to an operator of the vehicle the desirability of obtaining a measurement at a current location of vehicle 100 and the operator may decide whether or not to invoke a measurement process. If the operator does invoke a measurement process, or if the measurement process is invoked automatically, motors and electrical systems of vehicle 100 may be placed in a measurement mode in which electromagnetic interference is reduced (for example, by shutting down an engine of vehicle 100 or shutting down electric drive motors for vehicle 100). Measurements are then obtained using sensors 114. The sensor readings are logged together with time, position, or time and position readings and/or transmitted to a central system.

While vehicle 100 is taking measurements at locations 152, a signal is generated by an EM telemetry transmitter which is downhole in the well being drilled by drill rig 142. In some embodiments, the EM telemetry system is configured to generate a specific EM telemetry signal for testing purposes that facilitates identification of the signal and/or identification of optimum locations for ground conductors for receiving the signal. For example, in some embodiments the signal comprises a signal which has multiple frequency components which are present either at the same time or at different times. For example, the EM telemetry transmitter may be configured to transmit frequency sweeps.

In some embodiments, the testing signal is different from signals that would be used for EM telemetry. For example, the downhole tool may have a test mode in which a telemetry transmitter transmits EM signals having frequencies higher than are normally used for EM telemetry (e.g. signals having frequencies in excess of 15 Hz). Since the downhole tool may be quite close to the surface at least during initial testing, such signals may be detected at the surface even though higher frequency signals could be harder to detect when the telemetry transmitter is at greater depths. In some embodiments, the testing signals are higher in amplitude than normal EM telemetry signals. In some embodiments, the EM telemetry transmitter is powered from the surface so that high power consumption while transmitting the test signals is not a concern. In some embodiments, the test signal changes in a pattern (e.g. switching on and off in a pattern and or changing frequencies/phases/or amplitudes in a pattern).

In some embodiments, the timing of the EM telemetry signals is known to surface equipment at the well site. For example, for testing purposes, the downhole EM telemetry transmitter may be connected to the surface equipment by a wired connection that allows the surface equipment to obtain a signal that is synchronized to the EM telemetry signals being broadcast by the downhole EM telemetry signal generator. The surface equipment may provide these signals to vehicle 100, for example, by way of a wireless link. Vehicle 100 may use these timing signals to improve its opportunity to detect the signals from the downhole EM telemetry transmitter. For example, apparatus on vehicle 100 may comprise a lock-in amplifier which uses the timing signals as a time reference in order to detect EM telemetry signals over a number of periods of a signal from the EM telemetry transmitter.

In some embodiments, the signal received at vehicle 100 may be a known signal. Vehicle 100 may compute a signal-to-noise value for received signals. The signal-to-noise values could be used to select appropriate locations for ground conductors.

In some embodiments, vehicle 100 may have access to a control input to the downhole EM telemetry transmitter. For example, vehicle 100 may have a wireless link to a downlink EM telemetry transmitter, a downlink MP telemetry transmitter or a wired communication link to the downhole EM telemetry transmitter. Vehicle 100 may use this access to cause command signals to be sent to the downhole EM telemetry transmitter. The command signals may, for example, cause the downhole EM telemetry transmitter to start or stop broadcasting EM telemetry signals and/or to alter amplitude, frequency or other characteristics of the EM telemetry signals. In an example embodiment, vehicle 100 uses this access to cause the downhole EM telemetry signal generator to broadcast the EM telemetry signals each time vehicle 100 is ready to take a measurement.

Data obtained by vehicle 100 may be analyzed, in real time or on completion of the survey, in order to identify hot spots (i.e. areas in which the signal is received particularly strongly from the downhole EM telemetry transmitter) as well as areas in which electromagnetic noise (e.g. from drill rig equipment 148) is particularly well received. These locations may be selected respectively for the introduction of conductors for signal detection and the introduction of conductors for noise cancellation.

As an example search pattern, vehicle 100 may drive in path 150 which spirals inwardly or outwardly from drill rig 142 to lease boundary 149. In an example embodiment, adjacent turns of the spiral may be separated from one another by distances on the order of 1 metre. For example, the distances may be in the range of ½ metre to 3 metres. Locations 152 may be spaced apart along path 150 by similar distances, for example. After this search pattern has been completed, one or more hottest areas may be identified from the sensor readings obtained during the search pattern. The ideal locations for ground conductors may then be refined by further searching located at the areas of the hot spots. For example, vehicle 100 may be configured to take additional sensor readings at more closely spaced locations within the hottest area(s).

Once vehicle 100 has selected locations for ground conductors, vehicle 100 may be used, if suitably equipped, to insert ground conductors at the selected locations and, if vehicle 100 comprises cable reels, cable reels may be used to run cables from the locations of these ground rods to an EM telemetry signal receiver.

As an alternative to using a downhole EM telemetry transmitter to transmit signals for detection by vehicle 100, in some embodiments an electrical signal generator is connected to insert an electromagnetic signal into the ground by way of the blowout preventer 144 and the casing of the well. For example, an electromagnetic signal generator may be connected between blowout preventer 144 and one or more ground electrodes located close to drill rig 142. Signals from such a signal generator may propagate through the ground and may provide initial guidance on the best places to locate conductors for receiving signals from a downhole EM telemetry transmitter.

In some embodiments, to expedite surveying, where a retractable grounding conductor such as ground rod 123D is provided, the retractable grounding conductor is not deployed at every measurement location 152. In some cases, signals from other ground conductors, such as 123A, 123B, and/or 123C are measured. Ground conductor 123D may be deployed only in those locations for which signals measured from the other provided ground conductors indicate that the location may be particularly good for receiving EM telemetry transmissions and/or placing a noise cancellation electrode.

It has been found that grounding rods for receiving EM telemetry transmissions in general are most effective if they follow a trajectory which is aligned with the drill bit direction. In directional drilling the drill bit may be caused to follow a trajectory that is not perpendicular to the surface. In some embodiments, vehicle 100 is programmed to know the current downhole trajectory at the drill bit or alternatively at a location of a downhole EM telemetry transmitter. This information may be preprogrammed into vehicle 100, set by an operator of vehicle 100, and/or received from surface equipment transmitted to vehicle 100 by way of a wireless data link. In such embodiments, the device provided on vehicle 100 for installing ground conductors may be configured to angle the ground conductors so that they are placed in the earth at an angle and extending in a direction which matches the current trajectory.

In some embodiments, vehicle 100 may be configured to measure ground resistance between two different locations. For example, once two ground contacting electrodes are established, vehicle 100 may be used to measure an electrical resistance between different pairs of the ground contacting electrodes (e.g. vehicle 100 may comprise an ohmmeter or a megger connected for measuring the electrical resistance between a pair of ground contacting electrodes). For downlink electromagnetic telemetry signals it is desirable to use ground conductors that are at locations such that the electrical resistance between the conductors provided by the soil is larger than a very small value. This permits higher voltages to be used for transmitting downlink EM telemetry signals without exceeding the current injecting capacity of a downlink EM telemetry transmitter. Vehicle 100 may be used to compare the electrical resistance between a range of different pairs of ground contacting electrodes in order to find optimal sets of the ground contacting electrodes to use for downlink EM telemetry transmissions.

After a set of ground contacting electrodes have been installed at a well site, vehicle 100 may be used to continuously optimize the locations of the ground contacting electrodes. For example, as the well is drilled deeper and the location downhole of the EM telemetry transmitter becomes deeper, the best locations for receiving signals for the EM telemetry transmitter may change. Vehicle 100 may be used to periodically search for new hot spots that may be used to better receive the uplink telemetry signals.

In some embodiments, vehicle 100 includes features which reduce or eliminate magnetic and/or electrical interference created by vehicle 100. For example:
- some or all structural components of vehicle 100 may be made of non-magnetic materials such as aluminium, plastic, and/or stainless steel;
- electrical circuits in vehicle 100 may be shielded to avoid creating electromagnetic interference;
- vehicle 100 may comprise hydraulic and/or pneumatic control lines for many functions;
- vehicle 100 may be powered by one or more shielded electric motors, diesel cycle engines, or pneumatic motors which do not produce electrical interference;
- vehicle 100 may comprise one or more coils or other magnets and/or one or more electrodes that are controlled to null magnetic and/or electrical fields at the location of vehicle 100.

A vehicle as described herein may comprise a control system or controller configured to control vehicle 100 to automatically perform various functions as described herein. For example, the control system may be configured to perform one or more (in any combinations) of:
- causing vehicle 100 to drive in a search pattern;
- causing vehicle 100 to take and record measurements of voltage differentials;
- process voltage differentials to detect EM telemetry transmissions;
- issue control signals for a downhole telemetry system;
- insert a ground rod at a location;
- causing vehicle 100 to drive to an identified hot spot for receiving telemetry signals;
- measure electromagnetic noise or signal to noise ratios at different locations;
- measure electrical resistance between different ground rods;
- etc.

The control system may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like.

Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be carried by vehicle 100 or some processing may be performed off of vehicle 100 and may communicate to components carried by vehicle 100 by way of any suitable data communication link.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to".
"connected", "coupled", or any variant thereof, means any connection or coupling, either direct or indirect, between two or more elements; the coupling or connection between the elements can be physical, logical, or a combination thereof.
"herein", "above", "below", and words of similar import, when used to describe this specification shall refer to this specification as a whole and not to any particular portions of this specification.
"or", in reference to a list of two or more items, covers all of the following interpretations of the word: any of the items in the list, all of the items in the list, and any combination of the items in the list.
the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. Apparatus for determining one or more locations for placing receiver electrodes for electromagnetic telemetry, the apparatus comprising:
    a motorized land vehicle carrying at least one sensor for detecting electromagnetic energy and at least one position sensor;
    a first ground conductor carried by the vehicle and arranged to physically contact ground under or adjacent to the vehicle;
    a second around conductor arranged to physically contact the around; and
    a voltage monitor electrically connected to the first and second around conductors and operative to measure a differential voltage between the first ground conductor and the second ground conductor.

2. The apparatus of claim 1 wherein the first ground conductor is adapted to engage the ground while the vehicle is in motion.

3. The apparatus of claim 2 wherein the first ground conductor is mounted to a wheel or track carried by the vehicle and comprises electrically conductive protrusions that penetrate into the ground.

4. The apparatus of claim 1 wherein the second ground conductor is installed in the ground at a selected location spaced apart from the vehicle and is electrically connected to the voltage monitor by a cable.

5. The apparatus of claim 1 wherein the first ground conductor is retractably mounted to the vehicle and the vehicle comprises an actuator operable to selectively advance the first ground conductor into engagement with the ground or retract the first ground conductor out of engagement with the ground and a controller connected to control the actuator.

6. The apparatus according to claim 5 wherein the controller is configured to conduct a measurement by operating the actuator to engage the first ground conductor with the ground, operating the voltage monitor to measure the differential voltage and logging the differential voltage together with a position of the vehicle as determined by the position sensor.

7. The apparatus according to claim 6 wherein the controller is further connected to control a motor of the vehicle and is configured to shut down the motor while operating the voltage monitor to measure the differential voltage.

8. The apparatus according to claim 5 comprising one or more second actuators connected to adjust an angle of the first ground conductor relative to the ground for wherein the controller is configured to control the one or more second actuators to set the angle of the first ground conductor to be substantially parallel to a portion of a trajectory of a well bore.

9. The apparatus of claim 5 wherein the vehicle comprises:
   a fluid tank for containing a conductivity-enhancing fluid; and
   a pump connected to deliver the conductively-enhancing fluid from the fluid tank to a fluid injector, the fluid injector configured to dispense the conductivity-enhancing fluid in the vicinity of the first ground conductor.

10. The apparatus according to claim 9 wherein the first ground conductor is hollow and the pump is connected to deliver the conductivity-enhancing fluid to a bore of the first ground conductor and to thereby inject the conductivity-enhancing fluid into the ground in the vicinity of the first ground conductor.

11. The apparatus according to claim 1 comprising a mapping system storing a location of a well head and a boundary, the mapping system including a display showing a location of the vehicle relative to the well head and boundary.

12. The apparatus according to claim 1 wherein the vehicle comprises an autonomous navigation system configurable to cause the vehicle to follow a search path and to acquire and log measurements of the voltage differential at locations spaced apart along the search path.

13. The apparatus according to claim 12 wherein the search path covers a search area with paths that are separated by 3 m or less and the locations along the search path are spaced apart by 3 m or less.

14. The apparatus of claim 12 wherein the vehicle is autonomous or remotely operated by an operator.

15. The apparatus of claim 1 wherein the first ground conductor comprises a helical screw and the vehicle comprises a rotary driver connected for rotating the first ground conductor to insert the first ground conductor into the ground.

16. The apparatus of claim 1 wherein the vehicle comprises an electrical resistance measurement device connected to measure electrical resistance between the first and second ground conductors.

17. The apparatus of claim 16 wherein the vehicle comprises circuitry for comparing electrical resistances between a plurality of different pairs of ground conductors.

18. The apparatus of claim 1 wherein the vehicle comprises first and second magnetic field sensors, the second magnetic field sensor located at a greater elevation above the ground than the second magnetic field sensor.

19. The apparatus of claim 1 wherein the at least one sensor is configured to monitor the differential voltage for variations indicative of a known test signal broadcast by a downhole electromagnetic telemetry signal generator.

20. The apparatus of claim 19 wherein the test signal has a frequency of 15 Hz or more.

21. A method for locating locations to place receiver electrodes for receiving electromagnetic telemetry transmissions, the method comprising:
   while operating a downhole EM telemetry signal generator in a borehole to emit a test signal, monitoring for the test signal at plural locations around the borehole using at least one sensor for detecting electromagnetic energy relevant to a suitability of a location for electromagnetic telemetry reception;
   wherein the at least one sensor is mounted on a vehicle and the method includes:
   moving the vehicle to different ones of the plural locations around the borehole; and
   recording positions of one or more of the plural locations at which the test signal is most strongly detected.

22. A method for placing receiver electrodes for receiving electromagnetic telemetry transmissions, the method comprising:
   while operating a downhole EM telemetry signal generator in a borehole to emit a test signal, monitoring for the test signal at locations around the borehole using at least one sensor for detecting electromagnetic energy relevant to a suitability of a location for electromagnetic telemetry reception, the at least one sensor mounted on a vehicle;
   autonomously controlling the vehicle to traverse a search path, monitor for the test signal at locations along the search path, and record positions of one or more of the locations along the search path at which the test signal is most strongly detected; and
   placing a ground conductor at one or more of the recorded positions.

* * * * *